Jan. 2, 1951 N. CLARK, JR 2,536,032

PULSE WAVE FORM DISCRIMINATOR

Filed April 24, 1946 2 Sheets-Sheet 1

INVENTOR.
NEIL CLARK, Jr.

BY N. S. [signature]

ATTORNEY

Jan. 2, 1951 N. CLARK, JR 2,536,032

PULSE WAVE FORM DISCRIMINATOR

Filed April 24, 1946 2 Sheets-Sheet 2

*INVENTOR.*

NEIL CLARK, Jr.

*BY* N. S. Hounfeld

ATTORNEY

Patented Jan. 2, 1951 2,536,032

UNITED STATES PATENT OFFICE 2,536,032

PULSE WAVE FORM DISCRIMINATOR

Neil Clark, Jr., Washington, D. C.

Application April 24, 1946, Serial No. 664,451

7 Claims. (Cl. 177—353)

(Granted under the act of March 3, 1883, as amended April 30, 1928; 370 O. G. 757)

The present invention relates to a pulse selector system and more particularly to an electrical system adapted to exercise control functions in response to the receipt of pulse waveform signals of known and definite duration.

In many instances it is desirable to control the operation of a plurality of control functions responsive to pulses of electrical energy. Pulses of definite selectable durations may be employed to control the operation of a plurality of controls. Where pulses of definite and selectable duration are employed to operate a plurality of controls, it is necessary to provide a pulse duration selector system responsive to small variations of pulse duration.

Accordingly, it is an object of this invention to provide a pulse duration selector system sensitive to small variations of pulse width.

Another object of the invention is to provide a pulse duration selector system responsive to a plurality of pulses having a plurality of known variable pulse widths.

A further object is to provide a pulse duration selector system operative only upon application of a pair of pulse signals of selected duration.

Other and further objects and features of the present invention will become apparent upon a careful consideration of the following detailed description when taken together with the accompanying drawings which illustrate a typical embodiment of the invention and the manner in which that embodiment may be considered to operate.

According to the general concepts of the present invention, a pulse waveform selector system is provided which causes the operation of selectable ones of a plurality of output channels in dependency on pulse type waveforms of selected characteristics. To achieve the foregoing, the system is adapted to receive a pair of pulses. A first pulse of relatively long duration is applied to a series of pulse shaping circuits to gate the selector system and a second pulse having a definite selectable width is employed to operate one of a plurality of output channels.

The above-mentioned second pulse is applied to two differential coupling networks in such a way as to produce a first time marker coincident with the leading edge of the second pulse and a second time marker coincident with the lagging edge of the second pulse. The time markers are applied to a transmission line section through a charging circuit. Coincidental occurrence of the first time marker and the second time marker as a result of the action of the transmission line section in response to a second pulse of selected width renders operative one of a plurality of output channels.

Figure 1:
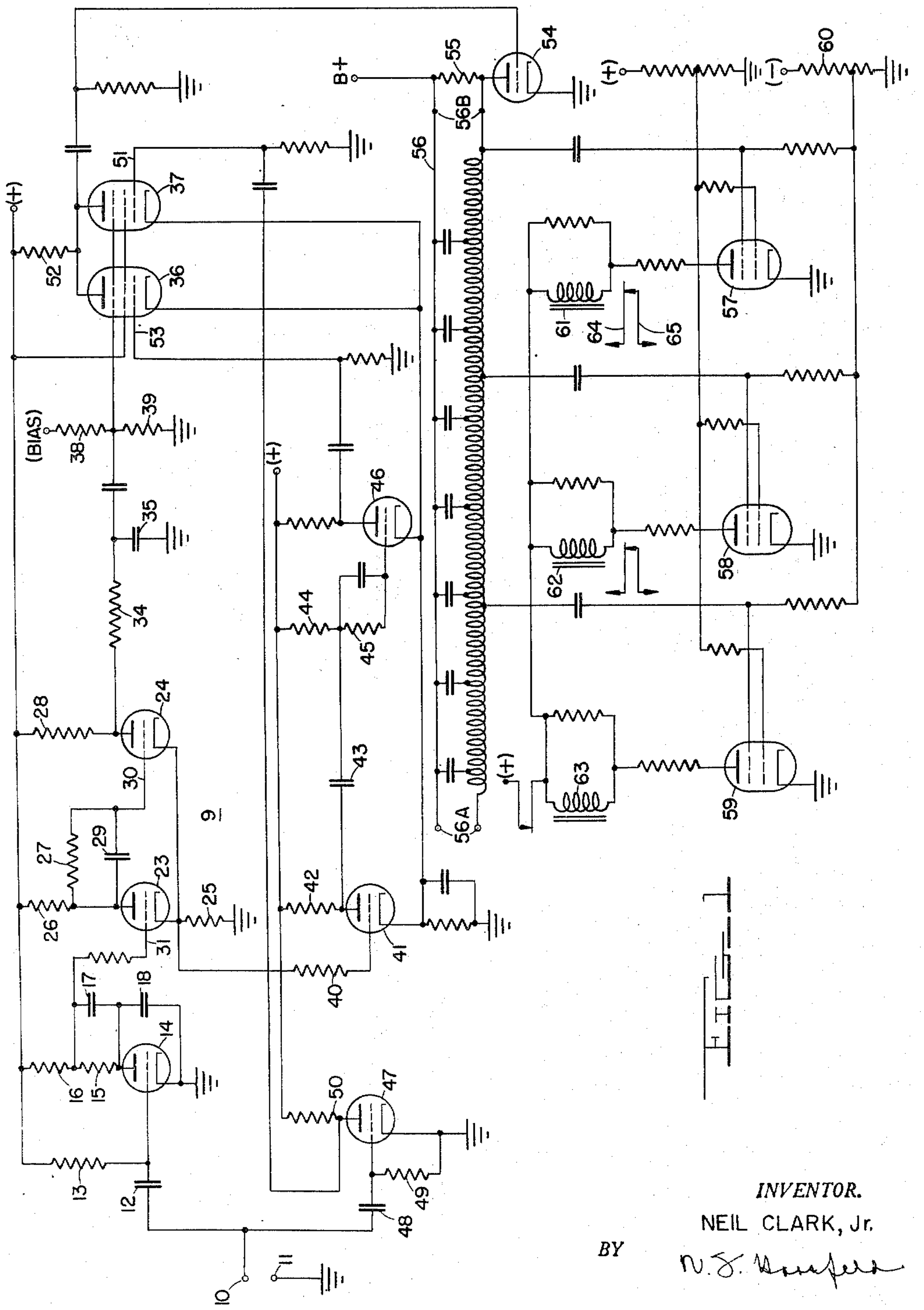
Fig. 1 is a schematic diagram showing one embodiment of the features of the present invention.

With reference to Fig. 1 a particular embodiment of the features of the present invention is shown as applied to the selective response to pulse waveforms. A pair of negative voltage pulses is introduced at input terminals 10 and 11. These pulses comprise a first pulse of relatively long duration and a second pulse having a definite variable duration and time spacing relative to the first pulse as shown in waveform A of Fig. 2.

The input pulses are applied through a coupling circuit comprising capacitance 12 and grid return resistance 13, to a sawtooth generator consisting of tube 14, anode loading resistances 15, 16 and capacitances 17, 18. Since grid resistance 13 is returned to a positive voltage supply, tube 14 is conducting in the quiescent state prior to the application of the pulses to terminals 10, 11. During this period capacitances 17, 18 will be charged to voltages determined by the voltage drops across resistance 15 and 16 and the tube 14, respectively.

By way of example, the first pulse of a pair of negative pulses applied to the grid of tube 14 causes cutoff of anode current in tube 14. Capacitance 18 then begins to charge through resistances 15, 16 to a total potential thereacross equal to the positive supply voltage while capacitance 17 begins an exponential discharge through resistance 15. The charging of capacitance 18 is interrupted upon termination of the first negative pulse applied to the grid of tube 14. A similar action also takes place in response to the second pulse to produce a signal across capacitances 17, 18 as shown by waveform B of Fig. 2. During the quiescent period with tube 14 conductive the potential at the junction of resistances 15, 16 is constant. Charging of capacitance 18 and discharging of capacitance 17 resulting from the application of the negative pulses to the grid of tube 14 produces substantially linear rising voltages having amplitudes proportional to the duration of the applied negative pulses as indicated in waveform B of Fig. 2 by numerals 19, 20. Upon removal of the negative voltage from the grid of tube 14, capacitance 18 discharges rapidly through tube 14 and capacitance 17 charges through resistance 15 resulting in an abrupt drop in potential across capacitances 17, 18 as indicated on waveform B of Fig. 2 by numerals 21, 22.

The output of the sawtooth generator circuit as taken across capacitances 17, 18 is directly applied to a cathode coupled switch circuit comprising tubes 23, 24, a common cathode impedance 25, resistances 26, 27, 28 and capacitance 29. In the quiescent state tube 24 is conductive since the grid 30 thereof is tied to the positive supply potential through resistances 26 and 27. In the quiescent state, the large positive bias to which the grid 30 of tube 24 is returned causes grid conduction thereby resulting in the charging of capacitance 29 to a potential as determined by the voltage drop across resistance 27.

Anode load resistance 28 for tube 24 is preferably of a relatively small value permitting heavy flow of current through resistance 25 so that a large positive voltage is developed at the cathodes of tubes 23 and 24 in the quiescent state. This positive voltage on the cathode of 23 is of such magnitude, relative to the positive voltage maintained on the grid 31 of tube 23 by voltage divider action from resistances 15 and 16 as to cause anode current cutoff in tube 23 during the quiescent condition.

Figure 2:
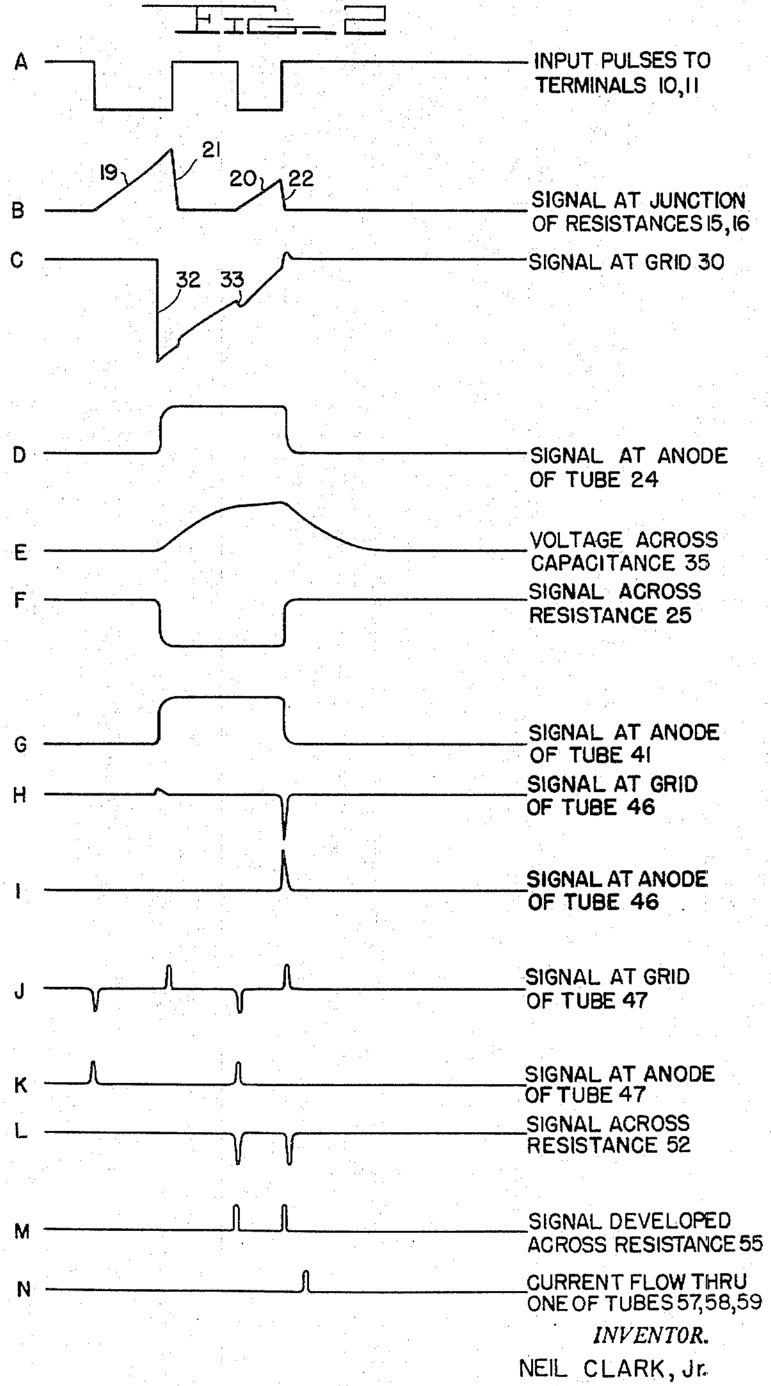
Fig. 2 shows a series of wave forms which are taken to illustrate the operation of the circuit shown in Fig. 1.

The voltage as typified by waveform B of Fig. 2, produced by the sawtooth generator circuit is applied to grid 31 of tube 23. The first linearly rising portion of the signal causes grid 31 to become more positive until a potential is reached at which current will begin flowing through tube 23. A resulting drop in the anode voltage of tube 23 is immediately impressed on grid 30 of tube 24 resulting in decreased current flow in tube 24 and decreased positive bias at the cathode of tube 23. Regenerative action of the cathode coupled switch circuit 9 causes an increased voltage drop at the anode of tube 23 which is relayed to grid 30 of tube 24 subsequently resulting in anode current cutoff of tube 24. Current flow through tube 23 is limited due to a relatively large value of resistance 26 in the anode circuit resulting in a condition of decreased positive cathode bias while anode current of tube 24 is cut off. The above described switching occurs rapidly in an abrupt voltage excursion at the grid 30 and the anode of tube 24 as shown in waveforms C and D respectively of Fig. 2. Upon termination of anode current flow in tube 24, capacitance 29 tends to discharge through resistance 27, causing the voltage on grid 30 to rise.

The drop in potential at grid 31 of tube 23 at the conclusion of the first input pulse, indicated by numeral 21 in waveform B of Fig. 2 is amplified in tube 23, and appears at the anode thereof and subsequently at the grid 30 of tube 24 in the form of a discontinuity indicated by numeral 32 on waveform C of Fig. 2.

The exponential rise of voltage at the grid 30 resulting from discharge of capacitance 29 is again altered upon occurrence of the second linearly rising voltage signal indicated by numeral 20 on waveform B of Fig. 2. The alteration resulting is in the form of a negative dip of potential as indicated by numeral 33 in waveform C of Fig. 2. Thereafter capacitance 29 continues to discharge resulting in the continued exponential rise of the potential of grid 30 and the eventual return to conduction by tube 24 when a small positive rise similar to discontinuity 32 occurs at the conclusion of the second pulse. Regenerative action hastens the operation of the switch circuit 9 resulting in the cutting off of anode current in tube 23 simultaneously with the conduction brought about in tube 24. Anode current flow in tube 24 causes a potential drop across resistance 28 coincident with the trailing edge 22 of the second one of the pair of pulses applied to the selector system as shown in wave form D.

One cycle of operation of the switch circuit 9 produces a positive gate pulse output at the anode of tube 24 illustrated by waveform D of Fig. 2. The leading edge thereof is nearly coincident with the trailing edge of the first one of the pair of input pulses applied to the selector system. The trailing edge of the positive gate pulse is substantially coincident with the trailing edge of the second pulse applied to the selector system. A negative pulse typified by waveform F of Fig. 2 similar to the positive gate pulse D is produced across the cathode biasing resistance 25.

Output pulses from the anode of tube 24 pass through an integrating network composed of resistance 34 and capacitance 35 to suppressor grids of a pair of pentodes 36 and 37 having a common anode load impedance. Suppressor grid bias supplied to the pentode tubes by voltage divider action through resistances 38 and 39 prevents anode current flow therethrough in the quiescent state. However, the integrated positive signal as shown in waveform E raises the suppressor grids so that tubes 36 and 37 are rendered responsive to variations in control grid voltage. For optimum operation it is desirable that the time constant of the integrating circuit be chosen to permit such a responsive condition to exist during the occurrence of a desired second pulse with negligible overlap before and after the pulse.

The negative pulse produced across resistance 25 is coupled through resistance 40 to the grid of an inverter tube 41 producing a positive pulse, illustrated by waveform G in Fig. 2, across the anode load impedance 42 thereof. The output from inverter 41 passes through a differentiating network consisting of capacitance 43 and resistances 44, 45 to the grid of a clipper tube 46. The waveform of the signal applied to the clipper tube is typified by H of Fig. 2. In the quiescent state before the application of a signal to the grid of the clipper tube, heavy flow of anode and grid current is maintained as a result of the positive bias supplied to the grid of clipper tube 46 by the voltage divider action of resistances 44 and 45. Impression of the differentiated signals from inverter tube 41 upon the clipper 46 results in amplification of the negative pulses and clipping of the positive pulses producing a positive marker pulse shown in waveform I of Fig. 2 coincident with the trailing edge of the second one of a pair of pulses applied to the pulse selector. Output from the clipper 46 is coupled to the amplifier 36 adapted to be gated by an integrated pulse from tube 30 as hereinbefore described.

Pulses applied to input terminals 10 and 11, besides being coupled to a sawtooth generator as hereinbefore described, are also applied to a clipper tube 47 through a differentiating network consisting of capacitance 48 and resistance 49. Pulses as shown in waveform A of Fig. 2 applied to input terminals 10, 11 appear on the grid of tube 47 as shown by waveform J of Fig. 2 as a result of the differentiating action. Action of the clipper tube 47 on the waveform J results in an output at the anode thereof as typified by waveform K of Fig. 2. Due to grid current flow, positive voltage pulses applied to the grid of tube 47 are clipped, whereas negative pulses are amplified and inverted. First and a second positive voltage markers typified in waveform K of Fig. 2 and coinciding respectively with the leading edges of the first and second pulses of waveform A are produced at the anode of tube 47 across the anode loading resistance 50. These positive voltage markers are applied to a control grid 51 of the gated amplifier 37. As previously shown; the integrated gating signal from tube 24 raises the suppressor grids of tubes 36, 37, sufficiently for anode current flow therein during a time interval coincident with the second one of the pair of pulses applied to input terminals 10 and 11, only the second positive voltage marker of waveform K will be amplified in tube 37 to appear across the common anode load impedance 52 as a negative pulse.

A positive voltage marker (waveform I), coincident with the trailing edge of the second one of the pair of pulses applied at terminals 10, 11 and coupled from tube 46 to a control grid 53 of tube 36 as described hereinbefore, will be amplified in tube 36 and appear across resistance 52 as a second negative pulse. Thus, for each pair of negative pulses applied to the input terminals 10, 11, a first and a second negative voltage marker coincident respectively with the leading and trailing edges of the second negative applied pulse will be produced across resistance 52 as shown in waveform L.

The combined output of amplifiers 36, 37 is applied to a power amplification tube 54. Connected across the load resistance 55 thereof is a section of transmission line 56 which may have lumped or distributed parameters. Line 56 is terminated in an impedance greater than the characteristic impedance so that reflection from the open end 56—A is produced without inversion upon the application of pulse energy to the end 56—B. Thus the transmission line will cause simultaneous occurrence at one point therein of reflected energy produced by the leading edge of the second pulse and direct energy produced by the trailing edge of the second pulse so that a condition of energy content approximately double that due to either edge alone is produced.

The shield grids of a plurality of gas tubes 57, 58, 59 are connected to various points on the delay line. In connection with this, it should be noted that employment of certain gas tubes such as type 2D21 makes desirable the use of the shield grid as a means of controlling the conductivity state of the tube. This condition results from the fact that a smaller amplitude signal of a given time duration would be required to fire the gas tube when applied to the shield grid than would be necessary on the control or first grid. Shield grid bias for the gas tubes is provided by voltage divider action across resistance 60. The bias thus supplied to the shield grids is sufficient to prevent ionization within the gas tubes except as a result of the occurrence of such a double energy condition. Each of a plurality of relays 61, 62, 63 is associated with the anode circuit of one of the gas tubes and is operable thereby upon initiation of conduction within the associated gas tubes.

By way of example, when a pulse signal of the type of waveform L of Fig. 2 is applied to the tube 54, positive pulses represented by waveform M of Fig. 2 will be developed across resistance 55. The first positive pulse propagated down the line 56 will be reflected without inversion. The second positive pulse of waveform M, delayed a time equal to the pulse duration of the second one of the input pulses of waveform A will coincide with the reflected first positive pulse marker at some point along the delay line 56 producing a momentary potential at that point equal to the sum of the two marker pulses. If superimposition of the marker pulses occurs at the point on the delay line to which the shield grid of one of the gas tubes 57, 58, 59 is coupled, the raised grid potential will be sufficient to permit ionization of that particular tube. Operation of the associated output relay 61 resulting from current flow in one of the gas tubes typified by tube 57 opens a pair of output contacts 64, 65, associated with relay 61 so that a controlled circuit may be actuated. Although the firing impulses applied to the shield grids of the gas tubes are of short duration, whenever the gas tubes 57, 58 are fired, they will continue to conduct until the plate supply voltage thereof is removed.

Termination of operation of the circuits controlled by relays 61, 62 is brought about by sending a multiple pulse waveform of the character of that shown in waveform A in which the second pulse is of sufficient duration to cause firing of gas tube 59. Subsequently, operation of relay 63 results in the removal of the plate supply voltage from the gas tubes 57, 58, 59 so that deionization thereof can occur. To prevent oscillatory action of tube 59 with relay 63 it is desirable that the reclosing time of the relay 63 contacts be relatively long so that deionization of tube 59 will occur before anode voltage is again applied thereto.

Following the operation of relay 63 it is desirable to allow a period of several milliseconds before the application of another pulse waveform signal to the terminals 10, 11. This period is required for two reasons. Deionization of the gas within the tubes 57, 58, 59 requires a finite period of time, perhaps 2000 microseconds. Then, too, the operation of the relays is not instantaneous but requires some time.

It should be noted that the duration of the first one of the pair of pulses of waveform A must be within a selected time duration range. If the duration of the first pulse is too short, the sawtooth voltage output produced across capacitances, 17, 18 will be of insufficient amplitude to trigger the cathode coupled switch 9. If the duration of the first pulse is extended beyond the maximum critical duration, excessive discharge of capacitance 29 would result in the return to conduction by tube 24 before the trailing edge 22 of the second sawtooth signal. In case of a very long first pulse, the positive voltage excursion of the grid 30 of tube 24, indicated by 32 in waveform C of Fig. 2, would cause tube 24 to conduct current, thus again prematurely terminating the switching action.

From the foregoing discussion it is apparent that considerable modification of the features of this invention is possible, and while the device herein described and the form of apparatus for the operation thereof, constitutes a preferred embodiment of the invention, it is to be understood that the invention is not limited to this precise device and form of apparatus, and that changes made therein without departing from the scope of the invention which is defined in the appended claims.

The invention described herein may be manufactured and used by or for the Government of the United States of America for governmental purposes without the payment of any royalties thereon or therefor.

What is claimed is:

1. Apparatus for response to selected electrical signal groups wherein the signals within the groups have selected time occurrence, comprising; means producing a first keying signal in response to a first input signal of selected duration and a second keying signal in coincidence with the trailing edge of a second input signal, means producing a third keying signal in time coincidence with the leading edge of the second input signal, and mixing means producing an output signal when the first, second and third keying signals bear selected time separation.

2. Apparatus for response to selected electrical signal groups, comprising; means producing a first keying signal in response to a first input signal of selected duration and a second keying signal in coincidence with the trailing edge of a second input signal, means producing a third keying signal in time coincidence with the leading edge of the second input signal, mixing means amplifying said second and third keying signals in response to the production of the first keying signal, an unmatched terminated transmission line receiving energy from said mixing means and producing time coincidence of energy at a selected point therein when the third and second keying pulses bear selected time relationships, and biased electron tube means responsive to the time coincidence of energy in the transmission line means for producing an output signal.

3. Apparatus for response to selected electrical signal groups, comprising; means producing a first keying signal in response to a first input signal of selected duration and a second keying signal in coincidence with the trailing edge of a second input signal, means producing a third keying signal in time coincidence with the leading edge of the second signal, mixing means amplifying said second and third keying signals in response to the production of the first keying signal, an unmatched terminated transmission line receiving energy from said mixing means and producing time coincidence of energy at selected points thereof when the third and second keying signals bear selected time relationships, a plurality of gas electron tubes each connected to one of the selected points of the transmission line and biased to be rendered conductive when time coincidence of the energy occurs at the respective selected point of the transmission line, and relay means operative in response to conduction by one of said gas electron tubes to interrupt conduction by said electron tubes.

4. Apparatus for selective response to selected pulse type electrical signals, comprising; sawtooth generator means operative in response to each of the pulse type signals to produce sawtooth signals in which the amplitude of the linearly changing portions thereof is proportional to the duration of the pulse type signals, a switch circuit having one stable and one unstable state, means initiating the unstable state in said switch circuit in response to a selected amplitude of the initial sawtooth signals, integrating means producing a gating signal in amplitude dependency on the duration of the unstable condition in the switch circuit, a mixer amplifier stage selectively rendered capable of amplifying input signals upon production of large amplitude gating signals, means deriving a first keying signal having a time occurrence in coincidence with the leading edge of the second pulse type electrical signal, means applying the first keying signal to the mixer amplifier stage, differentiating coupling means deriving a second keying signal in response to the return to the stable stage in said switch circuit, means applying the second keying signal to said mixer amplifier, a transmission line section having first and second ends with the second end thereof terminated in an impedance other than the characteristic impedance, means applying energy from the mixer amplifier to the first end of said transmission line, a plurality of electronic switches connected to selected points on said delay line each biased to obtain one conductivity state upon simultaneous receipt from said transmission line of energy originally delivered to said transmission line by said last named means in response to the first and second keying signals produced by selected pulse type electrical signals, and resetting means including an additional biased electronic switch operative to place all electronic switches in a reference conductivity state upon application of first and second keying signals having other selected time relationships.

5. Apparatus for producing response to pairs of pulses having predetermined time spacing and duration comprising, means responsive to the first pulse of a pair of pulses having at least a predetermined duration to produce a gating pulse of fixed duration, means fed by said gating pulse for producing a first keying pulse in synchronism with the trailing edge of said gating pulse, means producing a second keying pulse synchronously with the leading edge of said second pulse, and a pulse time selector fed by said first and second keying pulses operative to produce an output only in response to a predetermined time spacing of said first and second keying signals.

6. Apparatus for producing response to pairs of pulses having predetermined time spacing and duration comprising, means responsive to the first pulse of a pair of pulses having at least a predetermined duration to produce a gating pulse of fixed duration, means fed by said gating pulse for producing a first keying pulse in synchronism with the trailing edge of said gating pulse, means producing a second keying pulse synchronously with the leading edge of said second pulse, mixing means for amplifying and combining said first and second keying signals, an unmatched terminated transmission line for receiving energy from said mixing means and producing time coincidence of energy at a selected point therein when the first and second keying signals bear selected time relationships, and biased electron tube means responsive to the time coincidence of energy in the transmission line means for producing an output signal.

7. Apparatus for producing response to pairs of pulses having predetermined time spacing and duration comprising, means responsive to the first pulse of a pair of pulses having at least a predetermined duration to produce a gating pulse of fixed duration, means fed by said gating pulse for producing a first keying pulse in synchronism with the trailing edge of said gating pulse, means producing a second keying pulse synchronously with the leading edge of said second pulse, mixing means for amplifying and combining said first and second keying signals, an unmatched terminated transmission line receiving said first and second keying signals from said mixing means and producing time coincidence thereof at selected points in the line when the first and second keying signals bear selected time relationships, and a plurality of amplifier channels, each connected to one of the selected points of the transmission line, each of said amplifier channels being rendered operative when time coincidence of the signals occurs at the respective selected point of the transmission line.

NEIL CLARK, JR.

No references cited.